Figure 1:
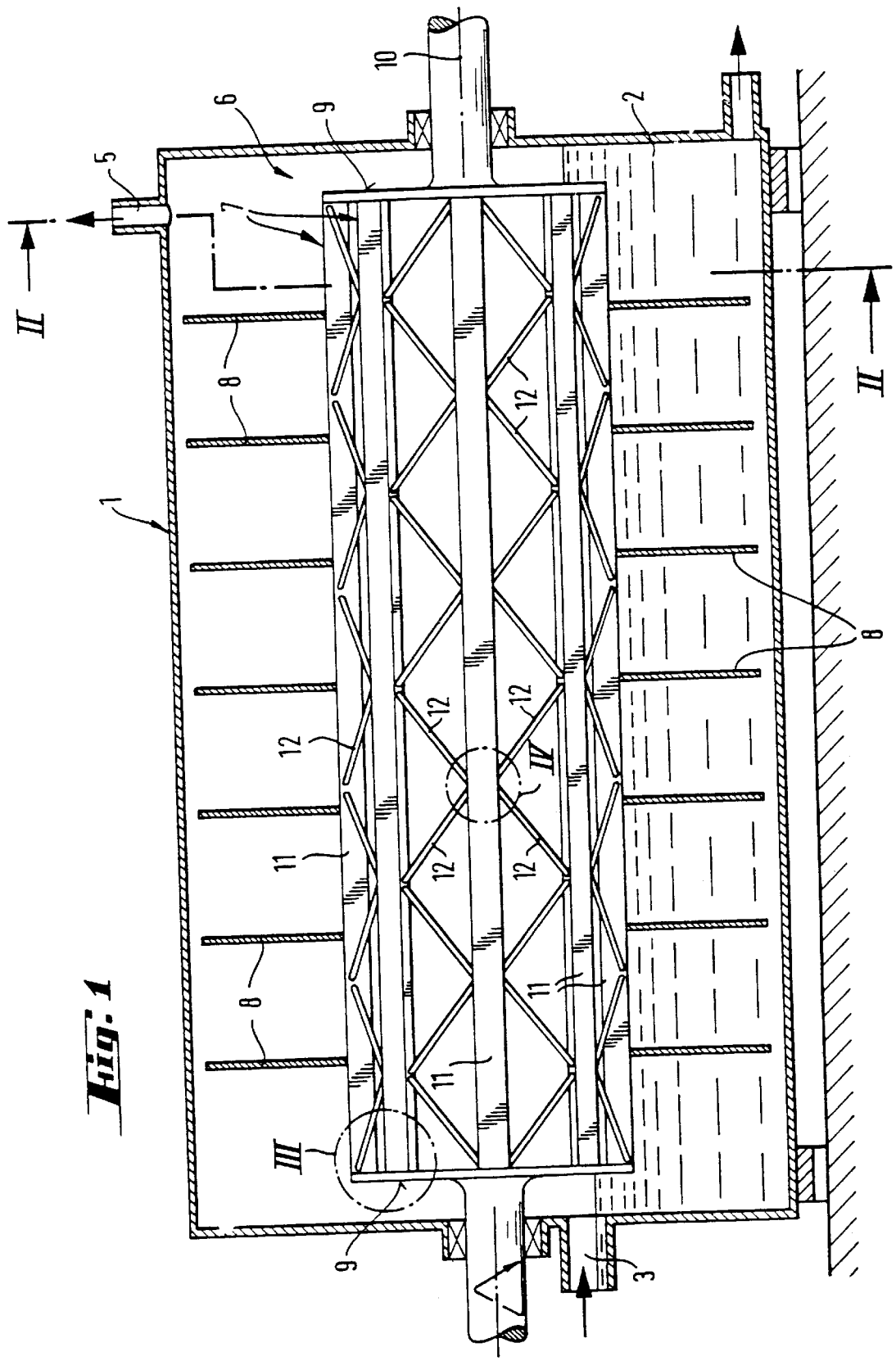

United States Patent

Hey et al.

[11] Patent Number: 6,007,782
[45] Date of Patent: Dec. 28, 1999

[54] REACTOR WITH A FLEXURALLY RIGID STIRRER ELEMENT

[75] Inventors: Hartmut Hey, Nierstein; Hans Lohe, Kronberg; Roland Schmidt, Mainz, all of Germany; Gordon Shaw, Charlotte, N.C.

[73] Assignee: Arteva North America S.a.r.l., Charlotte, N.C.

[21] Appl. No.: 08/712,429

[22] Filed: Sep. 11, 1996

[51] Int. Cl.[6] .................................................. B01J 14/00
[52] U.S. Cl. .......................... 422/135; 422/136; 422/137
[58] Field of Search .................................. 422/135, 136, 422/137

[56] References Cited

U.S. PATENT DOCUMENTS

| | | | |
|---|---|---|---|
| 3,248,180 | 4/1966 | Kilpatrick | 422/137 |
| 3,440,019 | 4/1969 | Albrecht et al. | 422/137 |
| 3,706,719 | 12/1972 | Goffinet, Jr. | 422/137 |
| 3,728,083 | 4/1973 | Greenburg et al. | 422/137 |
| 4,627,735 | 12/1986 | Rose et al. | 422/135 |
| 4,769,427 | 9/1988 | Nowakowsky et al. | 422/137 |
| 5,055,273 | 10/1991 | Wilhelm et al. | 422/135 |

FOREIGN PATENT DOCUMENTS

| | | |
|---|---|---|
| 0719582 | 7/1996 | European Pat. Off. . |
| 1595070 | 2/1971 | Germany . |
| 814439 | 3/1981 | U.S.S.R. ................................ 422/137 |
| 2208678 | 3/1980 | United Kingdom . |

OTHER PUBLICATIONS

"The Random House College Dictionary", Revised Edition, p. 190, Random House, Inc., New York (1980).

Primary Examiner—Timothy McMahon
Attorney, Agent, or Firm—Gregory N. Clements

[57] ABSTRACT

The invention relates to a device, in particular for the treatment of low-viscosity polymer melts, containing a vessel (1) with a stirrer element, the stirrer element (6) essentially comprising a support structure which passes through the vessel and on which surface formers (8) are arranged. According to the invention, the support structure is designed as a cage-like rod frame (7).

This results in the following advantages:

1. Owing to the now possible continuous wetting or wiping of the surfaces, encrustations and inhomogeneities are avoided.
2. Due to enhanced cascading with weir plates, the residence time spectrum can be controlled, which likewise improves the product quality.
3. The flexing of the stirrer element is reduced.

12 Claims, 4 Drawing Sheets

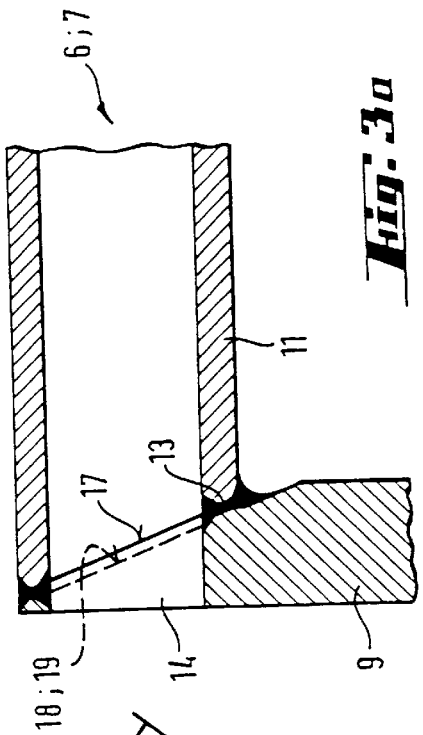
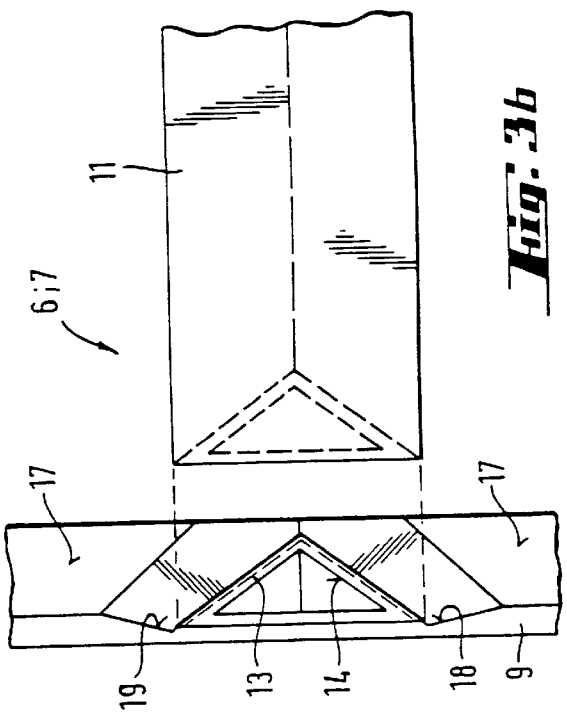
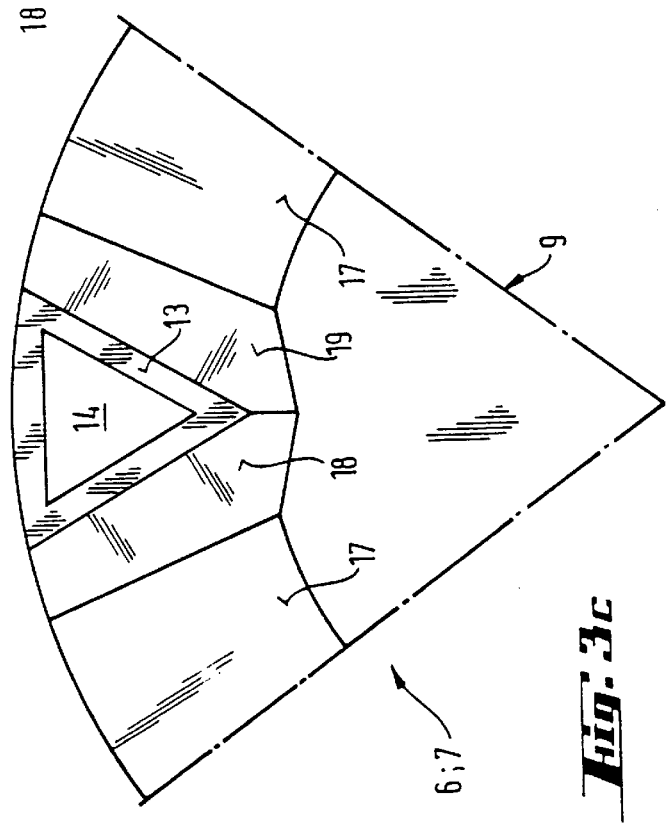

REACTOR WITH A FLEXURALLY RIGID STIRRER ELEMENT

The invention relates to a device, in particular for the treatment of low-viscosity polymer melts, containing a vessel with a stirrer element, the stirrer element essentially comprising a support structure which passes through the vessel and on which surface formers are arranged.

Devices of the said type are known, for example from DE 2,244,664 and DE 1,595,070, which disclose devices for the continuous preparation of high-molecular polyalkylene terephthalates from precondensates. These two known devices are constructed in accordance with one of the two following design principles: either, for transmitting the required forces and moments to the stirrer element, a centrally arranged shaft is used to which the surface formers are fitted, or the forces and/or moments are transmitted to the outside radius of the stirrer element, utilizing the surface formers, i.e. the process engineering elements.

The known device according to DE 2,244,664 essentially comprises a horizontal vessel with an inlet for the liquid precondensates and an outlet for the polycondensate, a plurality of chambers formed by partition walls with passage openings and having a common vapor space with a vacuum connection, and a single shaft passing lengthwise through the vessel and having surface formers which protrude into the chambers. The surface formers serve to generate large surface areas of the polycondensation liquid, such as free-falling curtains, which promote the removal of volatile reaction products during the polycondensation. Admittedly, using such devices, polyalkylene terephthalates can be prepared in a known manner, and also as described in DE 2,244,664, but with the following disadvantages: polycondensation liquid dropping down remains adhering to the shaft and fully polymerizes. This causes encrustations which can also break off and drop back again into the polycondensation liquid and lead to contaminations and inhomogeneities and thus impair the product quality. A further device of this type is disclosed by DE 1,595,070. In this device, the stirrer element is designed as a cylindrical cage and, in particular, it is formed from bar-shaped elements which are arranged on the peripheral side, extend parallel to the longitudinal axis of the vessel and are mutually connected via spirally arranged rods which represent chords of the cylindrical cage. To generate a liquid film, wires are fixed within the cage. These extend between the points of intersection of the rods with the bar-shaped elements and lie essentially in a plane perpendicular to the vessel axis.

This device has the disadvantage of a low flexural rigidity which places an upper limit on the length/diameter ratio of the vessel, since, in the case of stirrer elements which are unduly long in relation to the diameter of the vessel, the bar-shaped elements scrape along the vessel wall due to the flexing and thereby damage the device. If allowance were made in the vessel design for the flexing, different edge mobilities (difference between the internal diameter of the vessel and the external diameter of the stirrer) would result in the longitudinal direction. At points of unduly large edge mobility, the movement or the exchange of the polycondensation liquid would not longer be sufficient. The consequence would be caking on the vessel wall, with the disadvantages already described.

It is therefore the object of the invention to provide a device of the type indicated at the outset, wherein the disadvantages mentioned disappear. According to the invention, this is achieved by a device of the type indicated at the outset, which is characterized in that the support structure is designed as a cage-like rod frame.

The invention thus relates to a device, in particular for the treatment of low-viscosity polymer melts, containing a vessel with a stirrer element, the stirrer element essentially comprising a support structure which passes through the vessel and on which surface formers are arranged, characterized in that the support structure is designed as a cage-like rod frame.

Particular embodiments are evident from the subclaims.

One particular embodiment of the invention is a device for the treatment of low-viscosity melts, containing a horizontal vessel, through which the melt can be passed, with a stirrer element, the stirrer element essentially comprising a support structure which passes through the vessel and on which surface formers are arranged, characterized in that the support structure is designed as a cage-like rod frame and in that the inside radius of the rod frame is determined by the level of the melt.

The rod frame can be a tube-grid structure or it can comprise perforated tubes. The tube-grid structure can comprise profiled beams, preferably having a triangular profile, which are arranged parallel to the vessel axis and which are mutually connected by connecting elements, for example tubes. It can be terminated at both ends by an end disk. The connecting elements can be perpendicular or at an angle to the vessel axis. Preferably, they form triangles together with the profiled beams, particularly preferably isosceles and very particularly preferably equilateral triangles. The junctions of the profiled beams, which are arranged parallel, with the connecting tubes can be made in such a way that the susceptibility to fatigue is minimized, a "shoe" being welded to the profiled beam, the tube in turn being welded to the shoe. The "shoe" can be made either of solid material or it can be drilled correspondingly to the internal diameter of the tube. This construction allows an adequately secure transmission of the bending moments and torsion moments. The process engineering elements, the surface formers such as scooping and wiping blades, perforated plates, wire mesh and weir plates can be arranged on the rod frame or on the tube-grid structure without any problems.

The device according to the invention offers the following advantages:

Due to the continuous wetting or wiping of the surfaces, encrustations and inhomogeneities are avoided. The residence time spectrum can be controlled by enhanced cascading with weir plates, which likewise improves the product quality. The flexing of the stirrer element is reduced.

The materials which can be used are mainly the usual metallic materials familiar to a person skilled in the art: depending on the application, unalloyed or low-alloyed steels, rust-free or acid-resistant high-alloy steels, and nickel-based alloys of special materials for special applications.

The device is particularly suitable for the treatment of low-viscosity fluids, in particular for carrying out processes for the preparation of polycondensates, in particular polyesters such as polyethylene terephthalate (PET), by means of melt polymerization, preferably in the viscosity range from 0.15 to 0.35 dl/g, measured on solutions in dichloroacetic acid at 25° C. It is also generally suitable for gas treatment, degassing and vaporizing of low-viscosity fluids.

Below, the device according to the invention is illustrated in more detail by reference to the drawings in FIGS. 1 to 4 given by way of example, without it being intended to limit the invention thereby in any way.

Figure 2:
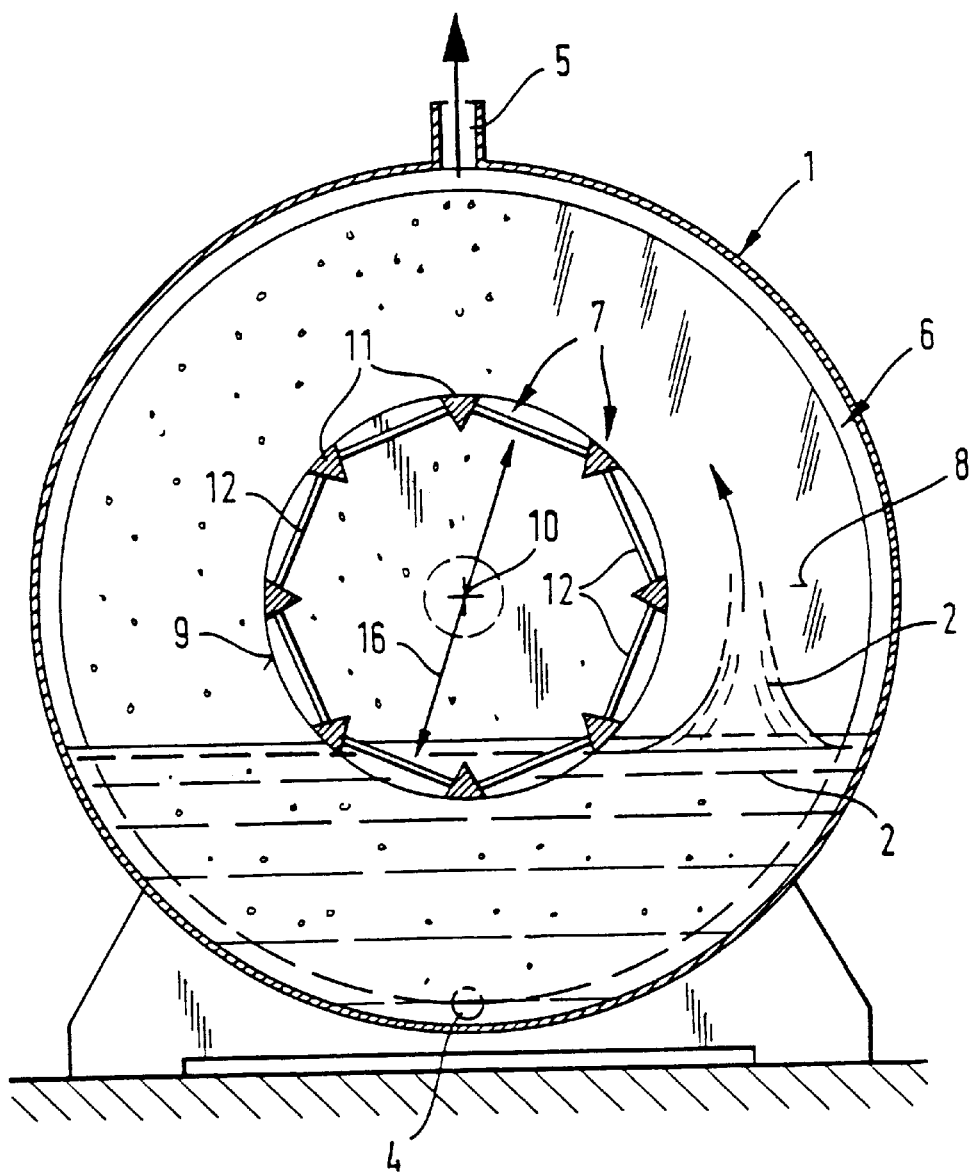
Figure 4:
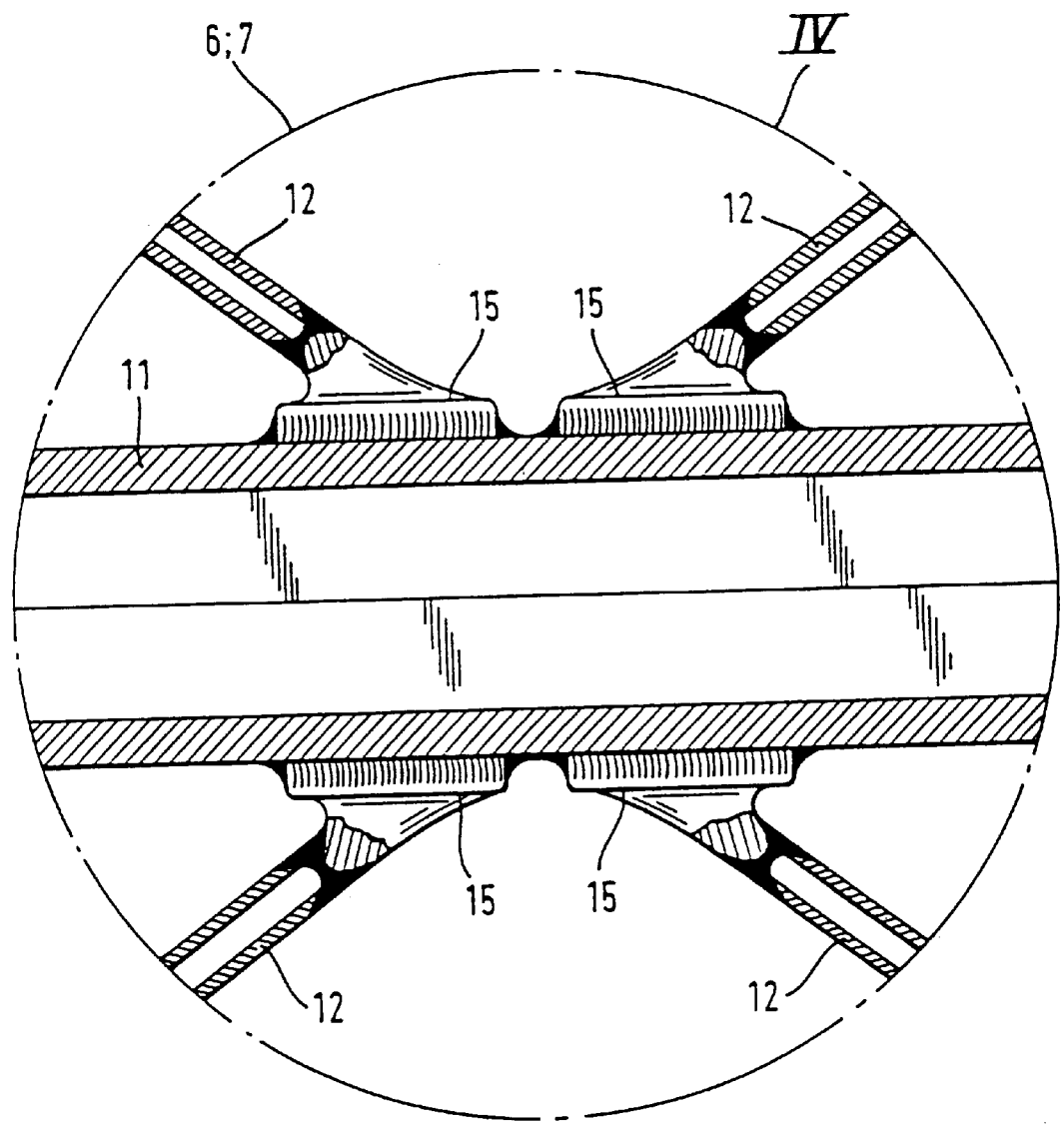

In the drawings,

FIG. 1 shows a perspective side view of a horizontal vessel 1 with a stirrer element 6, FIG. 2 shows the horizontal vessel 1 according to FIG. 1 in cross-section along II—II, FIGS. 3*a–c* shows detail III from FIG. 1, viewed from the side and in section (3*a*), viewed from above and before welding (3*b*) and viewed from the front toward the inside of the end disk 9 (3*c*), and FIG. 4 shows detail IV from FIG. 1.

FIG. 1 shows an embodiment preferred according to the invention, a horizontal vessel 1 for the treatment of a polycondensation liquid 2, with an inlet 3 and an outlet 4 for the liquid 2 and an outlet 5 for the gaseous polycondensation products, containing a stirrer element 6 which is rotatably mounted at both ends. According to the invention, the stirrer element 6 comprises a cage-like rod frame 7 which serves for force transmission and on which surface formers 8 are arranged. The cage-like rod frame 7 essentially comprises two end disks 9 which are mutually connected by profiled beams 11 arranged parallel to the longitudinal axis 10 of the vessel 1. Neighboring profiled beams 11 are mutually connected by tubes 12 in such a way that a network of triangles is formed. Both the connection of the beams 11 to the end disks 9 and the connection of the beams 11 to the tubes 12 is optimized with respect to the fatigue strength, and particularly preferably in accordance with the forms of embodiment shown in FIGS. 3*a, b, c* and/or 4. According to FIG. 3a, a welded lip 13, onto which the beam 11 (triangular profile) can be placed and welded on at both sides owing to an opening 14, is incorporated into the end disk 9. The welded lip 13 is here formed by a conical all-round chamfer 17 of the end disk 9, two groove-shaped recesses 18, 19 and the opening 14. According to FIG. 3*b*, the connection of tube 12 and beam 11 is effected via a "shoe" 15. Said shoe 15 can also be drilled. The internal diameter 16 of the rod frame 7 is made such that, in the course of one revolution of the stirrer element 6, all beams 11 and all tubes 12 dip into the polycondensation liquid.

We claim:

1. A device containing a vessel (1) with a stirrer element, the stirrer element (6) essentially comprising a support structure which passes through the vessel and on which surface formers (8) are arranged, characterized in that the support structure is desired as a rod frame (7).

2. A device for the treatment of low-viscosity melts (2) containing a horizontal vessel (1), through which the melt (2) can be passed, with a stirrer element (6), the stirrer element (6) comprising a support structure which passes through the vessel and on which surface formers (8) are arranged, characterized in that the support structure is designed as a rod frame (7) in the form of a cage and in that the inside radius (16) of the rod frame (7) is determined by the level of the melt (2).

3. A device according to claim 1, characterized in that the rod frame (7) is a tube-grid structure.

4. A device according to claim 1 characterized in that the rod frame (7) has profiled beams (11) which are arranged parallel to the vessel axis and in that at least neighboring profiled beams (11) are mutually connected by connecting elements.

5. A device according to claim 4, characterized in that the connection of the profiled beams (11) by the connecting elements is made in the form of a triangle.

6. A device according to claim 4, characterized in that the connecting elements are perforated tubes (12).

7. A device according to claim 5, characterized in that the triangular connection has the shape of an isosceles triangle.

8. A device according to claim 5, wherein the triangle is an equilateral triangle.

9. In a process for preparing low-viscosity polymer melts, the improvement which comprises using the device according to claim 1.

10. The process according to claim 9, wherein the melts are polycondensates which are of polyalkylene terephthalates.

11. In a method for generating large surface areas of a liquid, the improvement which comprise using a device according to claim 1.

12. In a method for the gas treatment, degassing or vaporization of a low-viscosity fluid, the improvement which comprises employing a device according to claim 1.

* * * * *